US010057187B1

(12) United States Patent
Dhoolam et al.

(10) Patent No.: US 10,057,187 B1
(45) Date of Patent: Aug. 21, 2018

(54) DYNAMIC RESOURCE CREATION TO CONNECT CLIENT RESOURCES IN A DISTRIBUTED SYSTEM

(71) Applicant: Amazon Technologies, Inc., Seattle, WA (US)

(72) Inventors: Surya Prakash Dhoolam, Seattle, WA (US); Christopher Magee Greenwood, Seattle, WA (US); Gary Michael Herndon, Jr., Seattle, WA (US); Madhuvanesh Parthasarathy, Seattle, WA (US); Danny Wei, Seattle, WA (US); Marc John Brooker, Seattle, WA (US); Tarun Goyal, Seattle, WA (US); Marc Levy, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 500 days.

(21) Appl. No.: 14/723,419

(22) Filed: May 27, 2015

(51) Int. Cl.
*G06F 15/173* (2006.01)
*H04L 12/911* (2013.01)
*H04L 29/08* (2006.01)

(52) U.S. Cl.
CPC ............ *H04L 47/783* (2013.01); *H04L 67/18* (2013.01)

(58) Field of Classification Search
CPC .................................. H04L 47/783; H04L 67/18
See application file for complete search history.

(56) References Cited

U.S. PATENT DOCUMENTS

| | | | |
|---|---|---|---|
| 7,823,063 B2 | 10/2010 | Ramani et al. | |
| 8,413,156 B2 | 4/2013 | Kasten et al. | |
| 8,549,607 B2 | 10/2013 | Mazarick et al. | |
| 8,671,403 B2 | 3/2014 | Sundarrajan et al. | |
| 8,793,684 B2 | 7/2014 | Breitgand et al. | |
| 8,843,935 B2 | 9/2014 | Hegdal et al. | |
| 2009/0276771 A1* | 11/2009 | Nickolov ............. | G06F 9/4856 717/177 |
| 2012/0324070 A1* | 12/2012 | Campion ............. | G06F 9/5066 709/223 |
| 2013/0041871 A1* | 2/2013 | Das ................... | G06F 17/30896 707/662 |
| 2014/0137110 A1* | 5/2014 | Engle .................. | G06F 9/5022 718/1 |
| 2014/0317622 A1* | 10/2014 | Hegdal ............... | G06F 11/0712 718/1 |
| 2014/0344810 A1 | 11/2014 | Wang | |
| 2015/0066929 A1* | 3/2015 | Satzke ................ | G06N 99/005 707/737 |
| 2015/0163157 A1* | 6/2015 | Hao ...................... | H04L 47/70 709/226 |

* cited by examiner

*Primary Examiner* — Moustafa M Meky
*Assistant Examiner* — Kidest Mendaye
(74) *Attorney, Agent, or Firm* — Robert C. Kowert; Meyertons, Hood, Kivlin, Kowert & Goetzel, P.C.

(57) ABSTRACT

A distributed system may implement dynamic resource creation for connecting resources. Resource creation requests may be received for resources which are accessed by other resources hosted in a distributed system. An intention for the creation request is stored to perform the creation request. At a subsequent time, a request to connect another resource to the resource of the creation request is received. An infrastructure locality for the other resource may then be identified and utilized to determine a placement location for the resource. The resource may then be created at the placement location according to the stored intention. The resource may then be connected with the other resource for access.

20 Claims, 7 Drawing Sheets

DYNAMIC RESOURCE CREATION TO CONNECT CLIENT RESOURCES IN A DISTRIBUTED SYSTEM

BACKGROUND

The recent revolution in technologies for dynamically sharing virtualizations of hardware resources, software, and information storage across networks has increased the reliability, scalability, and cost efficiency of computing. More specifically, the ability to provide on demand virtual computing resources and storage through the advent of virtualization has enabled consumers of processing resources and storage to flexibly structure their computing and storage costs in response to immediately perceived computing and storage needs. Virtualization allows customers to purchase processor cycles and storage at the time of demand, rather than buying or leasing fixed hardware in provisioning cycles that are dictated by the delays and costs of manufacture and deployment of hardware. Rather than depending on the accuracy of predictions of future demand to determine the availability of computing and storage, users are able to purchase the use of computing and storage resources on a relatively instantaneous as-needed basis.

Virtualized computing environments may provide various guarantees as to the availability and durability of computing resources. Distributing computing resources amongst multiple resource hosts may provide different availability and durability characteristics. For example, virtual computing resources may provide block-based storage. Such block-based storage provides a storage system that is able to interact with various computing virtualizations through a series of standardized storage calls that render the block-based storage functionally agnostic to the structural and functional details of the volumes that it supports and the operating systems executing on the virtualizations to which it provides storage availability. The placement of block-based storage relative to the computing virtualizations that utilize the storage may impact the performance of the storage and virtualizations with respect to access operations and failure scenarios. In these scenarios where the placement of different resources effects performance, such as the block-based storage, and computing virtualizations example given above, decisions to place resources may be independently performed (e.g., by different systems or services for each resource), allowing for sub-optimal placement of resources due to placement decisions that are unaware of the placement of other resources that effect performance.

Figure 1:
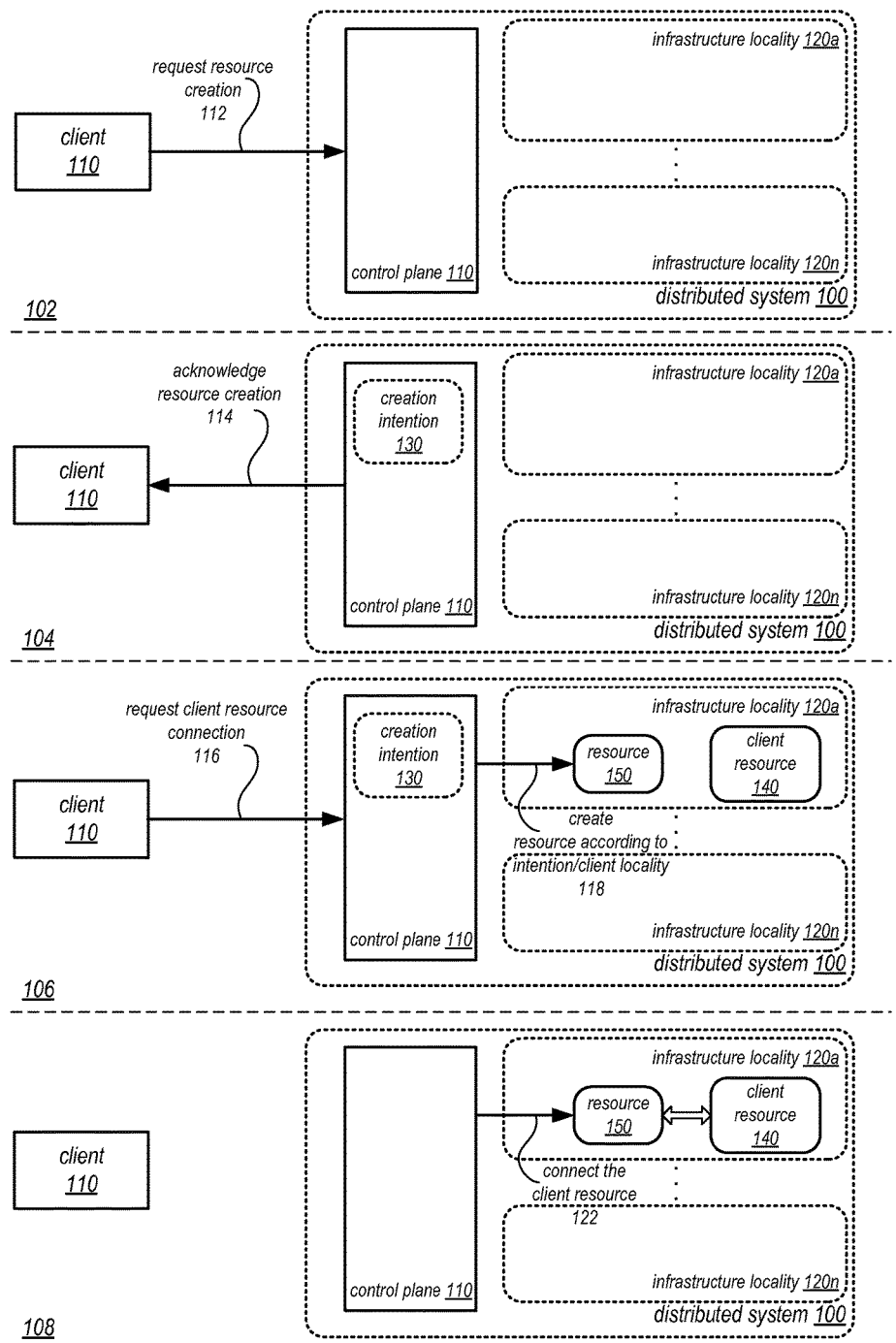
FIG. 1 is a series of logical block diagrams that illustrate dynamic resource creation to connect client resources, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement dynamic resource creation to connect client resources in a distributed system. Distributed systems may host various resources for performing or implementing different systems, services, applications and/or functions. Some resources may include multiple instances of a resource (e.g., various replicas, partitions, or other portions of a resource that collectively implement the resource). Other resources may be individual or stand-alone. Resources may be one of many different types of resources, such as one of various types of physical or virtualized computing resources, storage resources, or networking resources. For example, a storage service may host different replicas of data across a number of different resource hosts.

Resources may be connected to other resources as part of implementing the different systems, services, applications and/or functions. For instance, one resource may be a client of another resource that provides the client resource with additional functionality, services, or capabilities. One example is a resource that implements storage. Another resource performing data management, analysis or organization, may connect to the storage resource to store, arranged, access, or otherwise manage data stored thereon. In this way, the management resource can devout its own resources (e.g., computational, networking, etc.) to the performance of management tasks without also storing the data. Such connections between different resources are common in distributed systems. However, the placement of the resources (e.g., the location of a particular server, host, or system that implements the resource with respect to the other resource) may affect the performance of the connected resources. Consider the example given above where the data management resource is connected to the storage resource. If each resource is placed in locations that are distant in terms of the number of intervening networking devices (i.e., network hops), then actions taken by the management resource with respect to the storage resource (e.g., to retrieve or modify data) may be slower than if the two resources were placed closer. Thus, the performance of resources may be improved by placing resources in optimal locations with respect to other resources that may be connected to the resources.

Making placement decisions with respect to resources that may connect to a resource can prove challenging. Placement decisions may be made according to multiple placement criteria, in some embodiments, which may further optimize placement for other criteria in addition to location relative to a connecting resource. Generally, placement criteria may be used to determine a best or optimal placement location for an individual resource, as well as for placement of resources across the distributed system as a whole. For example, in order to provide or improve availability, durability, and/or other performance characteristics of resources, placement criteria may be used to determine particular locations at which resources should be placed (e.g., different or the same infrastructure localities, such as network router or brick). If no such location is available, then the placement criteria may indicate a less optimal location to place the resource (e.g., a resource host that is in a less efficient infrastructure locality, such as a different network router or brick than another resource with which the placed resource communicates). Placement criteria may include, but are not limited to, location of a resource with respect to other resources (e.g., placing a storage volume resource in a same location that is connected to a same network device as virtual computing resource that is a client of the storage volume), available bytes, IOPs, or slots, a resource utilization balance, such as bytes to IOPs balance, impact on capacity fragmentation, hardware/software characteristics, and/or various desired location-based determinations.

Placement criteria may be individually evaluated or combined as part of many different types of placement techniques. For instance, some placement techniques may optimize placement decisions to place resources in a way that maximizes a certain value, such as utilization metric (e.g., available storage). In some embodiments, placement techniques may implement different combinations of placement criteria, weighted the same or differently to place resources in way that maximizes multiple values (e.g., a score generated from weighting utilization metrics, fragmentation metrics, metrics that indicate optimal configuration or locality, or any other placement criteria).

In order to select among the competing interests that may be optimized by placement criteria, in various embodiments, some placement criteria may be more determinative. Co-locating a resource that is connected to another resource (e.g., a client of the other resource) in a common infrastructure locality (e.g., a common data center, common networking device, common host, or other physical or logical grouping of one or more devices that implement a distributed system), is one example, of placement criteria that if satisfied greatly reduces communication costs between two connected resources. Yet, the information necessary to evaluate the placement criteria which considers connecting resources may not exist or be available to the placement decision maker. For example, a storage volume may be created at a different time than a computing resource.

Dynamic resource creation to connect resource clients to resources in a distributed system may be implemented to create and place resources when desirable placement criteria, such as infrastructure locality, can be evaluated. FIG. 1 is a series of logical block diagrams that illustrate dynamic resource creation to connect client resources, according to some embodiments. Distributed system 100 may host a variety of resources, such as the various types of physical or virtualized computing resources, storage resources, or networking resources noted above. Different infrastructure localities, such as infrastructure localities 120a through 120n, may implement the resources hosted in distributed system 100. For example, in various embodiments, infrastructure localities 120 may be defined by devices, such as server racks, networking switches, routers, or other components, power sources (or other resource host suppliers), or physical or geographical locations (e.g., locations in a particular row, room, building, data center, fault tolerant zone, etc.), or logical groups of resources and/or devices. Distributed system 100 may implement control plane 110 to manage the creation, modification, access/connection, and/or deletion of resources hosted in distributed system 100. A client, such as client 110, may interact with distributed system 100 via control plane 110 to perform various actions and requests with respect to resources implemented in distributed system 100.

As illustrated in scene 102, control plane 110 may receive a request to create a resource 112 from client 110. The resource creation request may include various characteristics, criteria, settings, features or other specified aspects of the resource to be created. If, for instance, the resource is a storage volume, then the request may include a type of storage volume (e.g., magnetic-based or solid-state storage-based), size of storage volume, performance characteristics of the storage volume (e.g., number of Input/Output Operations per Second (IOPS)), etc. In various embodiments, the requested resource may be a resource that is accessed, managed, utilized, or otherwise operated by another resource that is a client of the requested resource. For instance, a computing resource, such as a virtualized computing system may access a storage volume store data and perform other operations. However, the other resource (sometimes referred to herein as the "client resource") may be unknown (e.g., does not exist or has not been selected by client 110).

As illustrated in scene 104, control plane 110 may store a creation intention 130 to perform the creation request. Creation intention 130 may maintain sufficient information to create the resource as requested at a later or subsequent time. Creation intention 130 may be a data structure, record, indication, or other form of representation that includes various information included in creation request 112, such as the various characteristics, criteria, settings, features or other specified aspects of the resource in order for the resource to be created. An acknowledgment of resource creation 114 may be provided to client 110, such that client 110 may operate as if the resource was created. For instance, a resource identifier may be provided, in some embodiments, to client 110 for use in subsequent requests to control plane 110.

The requested resource 112 may remain represented as creation intention 130 until such as time as the resource may be accessed. In this way, the requested resource may be created dynamically, as needed, instead of being created at the time of request 112 in a potentially sub-optimal location within distributed system 100. Moreover, hosting resources (e.g., host servers) may be more efficiently utilized, as resources that are not utilized (because there is no connection between the resource and another resource) do not consume hosting resources (e.g., virtual computing resources, storage resources, networking resources, etc.) until they are utilized. Thus, various thin provisioning schemes may be implemented for hosting resources in distributed system 100 as unconnected resources may not utilize hosting resources until they are connected. As illustrated in scene 106, client 110 may request that a client resource be connected 116 to access the resource. Client resource 140, located in, connected to, or otherwise associated with infrastructure locality 120a, may have existed prior to the resource creation request 112, in between the creation request 112 and connection request 116, or may have been created at infrastructure locality 120a as part of the connection request 116. In response to receiving the connection request 116, control plane 110 may access creation intention 130. Based on creation intention 130, control plane 110 may determine a placement location based on various placement criteria, such as those discussed above, including the infrastructure locality of client resource 140 (which may now be known to control plane, unlike when resource creation request 112 was received). The placement location may be, in various embodiments, a decision to co-locate the resource in the same infrastructure locality or as close to the same infrastructure locality as capacity in distributed system 100 (and infrastructure locality 120a) allows. Thus, as illustrated in scene 106, control plane 110 may create 118 resource 150 at the determined placement location in infrastructure locality 120a according to creation intent 130. For instance, infrastructure locality 120a may be a networking device, such as a network brick or router, to which a host implementing client resource 140 is connected. Creating 118 resource 150 in infrastructure locality may be creating the resource 150 at a different host that is also connected to the same networking device.

As illustrated in scene 108, control plane 110 may connect 122 the client resource 140 with the resource 150 according to the request 116. For instance, access controls, keys, tokens, or other information may be provided that allows client resource 140 to access resource 150.

Please note that previous descriptions are not intended to be limiting, but are merely provided as an example of dynamic resource creation to connect client resources, according to some embodiments. Various components may perform resource creation and connection management. Different numbers or types of resources and resource hosts may be employed. In some embodiments, a resource may include multiple instances of the resource (e.g., multiple replicas, partitions, or other portions of a resource, such as different replicas of a storage volume) each of which may be dynamically created. Alternatively, in some embodiments, some of the instances of a resource may be created in response to a request, such as request 112, and later migrated to a more optimal location, when a connection request 116, or other indication of infrastructure locality for a client resource is obtained.

This specification begins with a general description of a provider network, which may implement dynamic resource creation to connect client resources offered via one or more network-based services in the provider network, such as dynamic creation of data volumes offered via a block-based storage service that are accessed by virtual compute instances offered by a virtual compute service. Then various examples of a block-based storage service are discussed, including different components/modules, or arrangements of components/module that may be employed as part of a control plane for the block-based storage service. A number of different methods and techniques to implement dynamic resource creation to connect client resources are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
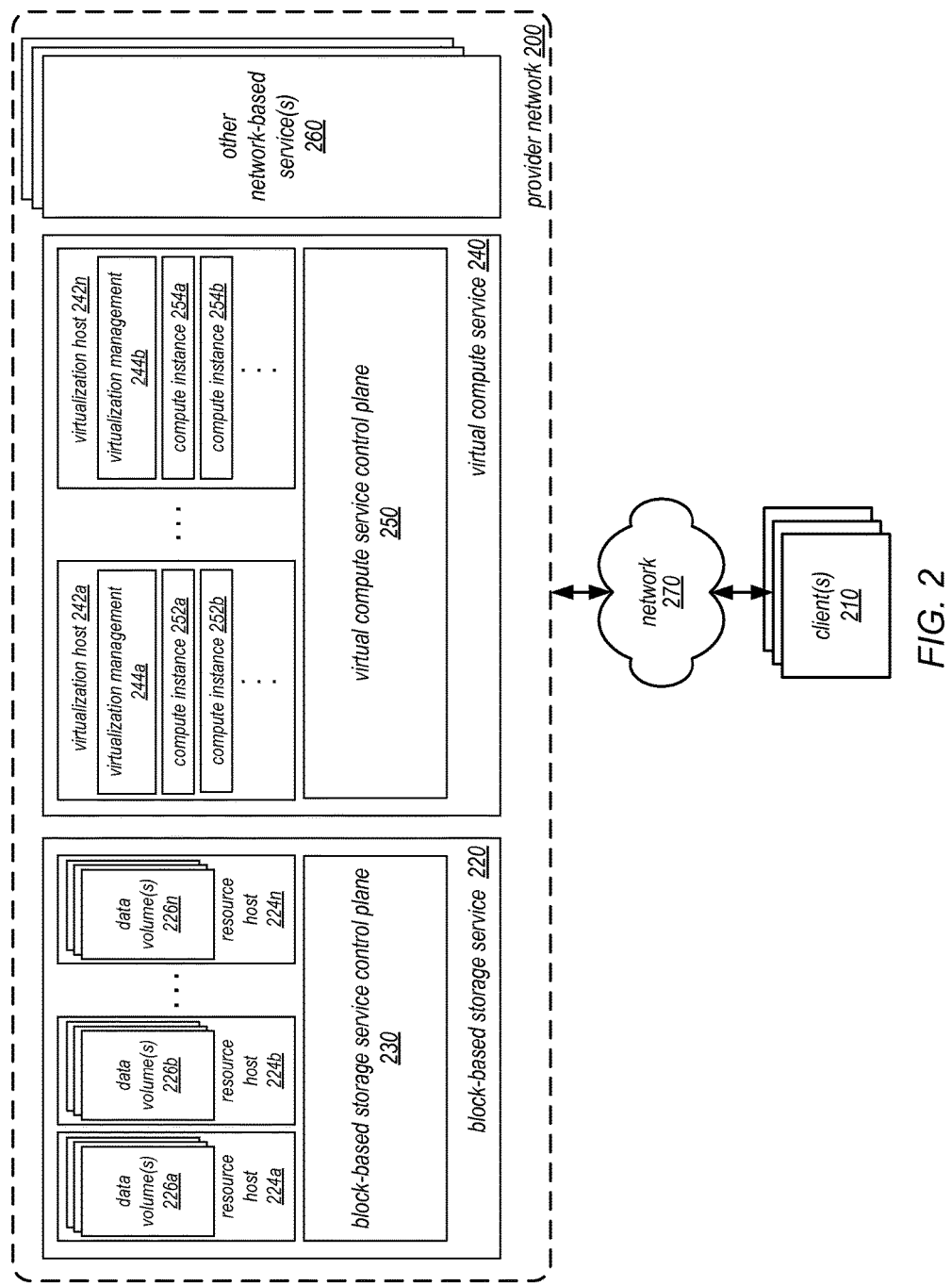
FIG. 2 is a block diagram illustrating a provider network that includes multiple network-based services such as a block-based storage service that implements dynamic resource creation to connect client resources, according to some embodiments.

FIG. 2 is a block diagram illustrating a provider network that includes multiple network-based services such as a block-based storage service that implements dynamic resource creation to connect client resources, according to some embodiments. Provider network 200 may be set up by an entity such as a company or a public sector organization to provide one or more services (such as various types of cloud-based computing or storage) accessible via the Internet and/or other networks to clients 210. Provider network 200 may include numerous data centers hosting various resource pools, such as collections of physical and/or virtualized computer servers, storage devices, networking equipment and the like (e.g., computing system 1000 described below with regard to FIG. 7), needed to implement and distribute the infrastructure and services offered by the provider network 200. In some embodiments, provider network 200 may provide computing resources, such as virtual compute service 240, storage services, such as block-based storage service 220, and/or any other type of network-based services 260. Clients 210 may access these various services offered by provider network 200 via network 270. Likewise network-based services may themselves communicate and/or make use of one another to provide different services. For example, computing resources offered to clients 210 in units called "instances," such as virtual or physical compute instances, may make use of particular data volumes 226, providing virtual block-based storage for the compute instances.

As noted above, virtual compute service 240 may offer various compute instances, such as compute instances 242a, 242b, 254a, and 254b to clients 210. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 240 in different embodiments, including special purpose computer servers, storage devices, network devices and the like. In some embodiments instance clients 210 or other any other user may be configured (and/or authorized) to direct network traffic to a compute instance. In various embodiments, compute instances may mount, connect, attach or map to one or more data volumes 226 provided by block-based storage service 220 in order to obtain persistent block-based storage for performing various operations.

Compute instances may operate or implement a variety of different platforms, such as application server instances, Java™ virtual machines (JVMs), special-purpose operating systems, platforms that support various interpreted or compiled programming languages such as Ruby, Perl, Python, C, C++ and the like, or high-performance computing platforms) suitable for performing client applications, without for example requiring the client 210 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

Figure 7:
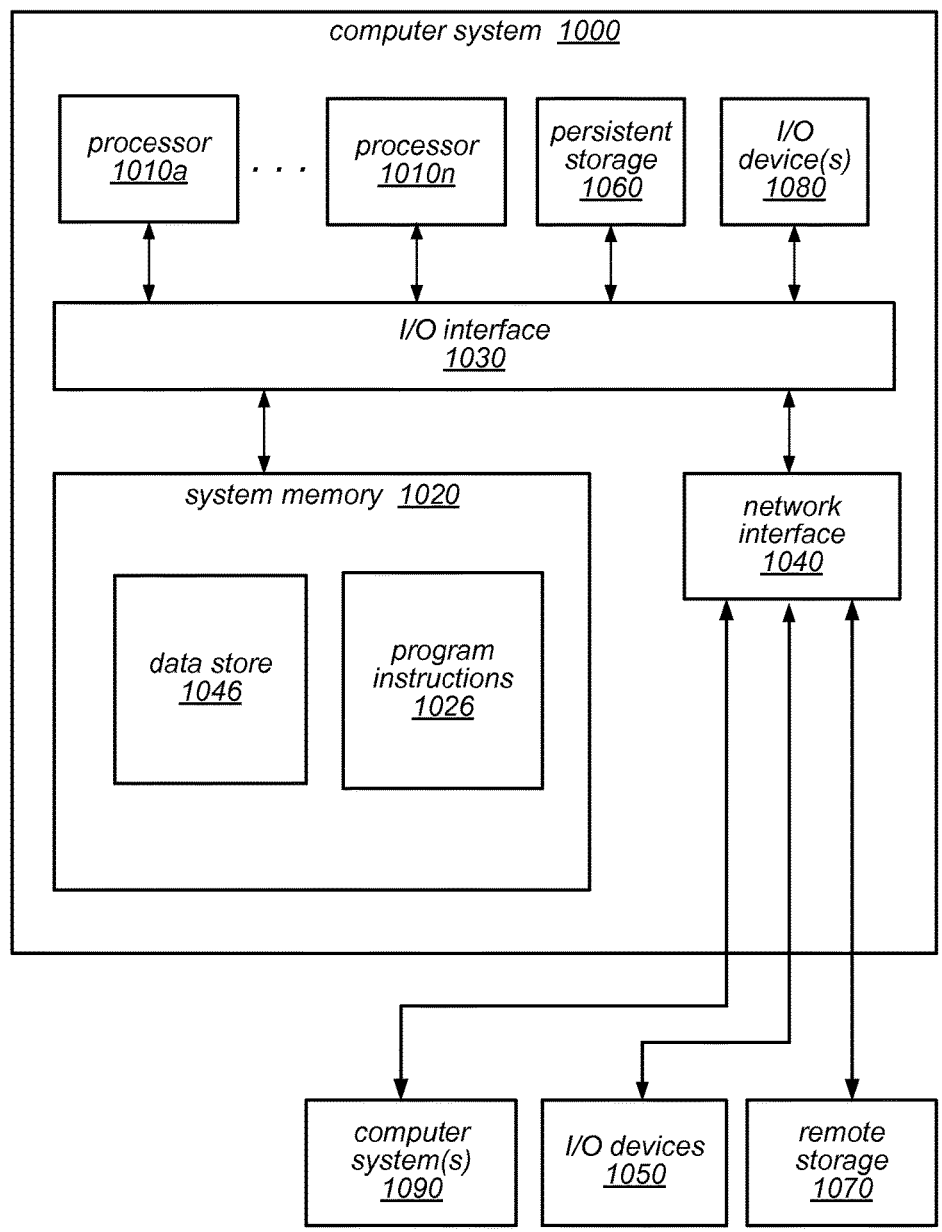
FIG. 7 is a block diagram illustrating an example computing system, according to some embodiments.

As illustrated in FIG. 2, a virtualization host, such as virtualization hosts 242a and 242n, may implement and/or manage multiple compute instances 252a, 252b, 254a, and 254b respectively, in some embodiments, and may be one or more computing devices, such as computing system 1000 described below with regard to FIG. 7. Virtualization hosts 242 may also provide multi-tenant hosting of compute instances. For example, in some embodiments, one virtualization host may host a compute instance for one entity (e.g., a particular client or account of virtual computing service 210), while another compute instance hosted at the same virtualization host may be hosted for another entity (e.g., a different account). A virtualization host may include a virtualization management module, such as virtualization management modules 244a and 244b capable of instantiating and managing a number of different client-accessible virtual machines or compute instances. The virtualization management module may include, for example, a hypervisor and an administrative instance of an operating system, which may be termed a "domain-zero" or "dom0" operating system in some implementations. The dom0 operating system may not be accessible by clients on whose behalf the compute instances run, but may instead be responsible for various administrative or control-plane operations of the network provider, including handling the network traffic directed to or from the compute instances.

Virtual computing service 240 may implement control plane 250 to perform various management operations. For instance, control plane 220 may implement resource management to place compute instances, and manage the access to, capacity of, mappings to, and other control or direction of compute instances offered by provider network. Control plane 250 may provide both a direct sell and 3$^{rd}$ party resell market for capacity reservations (e.g., reserved compute instances). For example, control plane 250 may allow clients 210 via to learn about, select, purchase access to, and/or reserve capacity for computing resources, either from an initial sale marketplace or a resale marketplace, via a web page or via an API. For example, control plane 250 may provide listings of different available compute instance types, each with a different credit accumulation rate. Control plane 250 may also offer and/or implement a flexible set of resource reservation, control and access interfaces for clients 210 via an interface (e.g., API). For example, control plane 250 may provide credentials or permissions to clients 210 such that compute instance control operations/interactions between clients and in-use computing resources may be performed.

In various embodiments, control plane 250 may track the consumption of various computing instances consumed for different virtual computer resources, clients, user accounts, and/or specific instances. In at least some embodiments, control plane 250 may implement various administrative actions to stop, heal, manage, or otherwise respond to various different scenarios in the fleet of virtualization hosts 242 and instances 252, 254. Control plane 250 may also provide access to various metric data for client(s) 210 as well as manage client configured alarms. In various embodiments, control plane 210 may implement billing management. Control plane 250 may be configured to detect billing events (e.g., specific dates, times, usages, requests for bill, or any other cause to generate a bill for a particular user account or payment account linked to user accounts). In response to detecting the billing event, billing management module may be configured to generate a bill for a user account or payment account linked to user accounts.

In various embodiments, provider network 200 may also implement block-based storage service 220 for performing storage operations. Block-based storage service 220 is a storage system, composed of a pool of multiple independent resource hosts 224a, 224b through 224n (e.g., server block data storage systems), which provide block level storage for storing one or more sets of data volumes data volume(s) 226a, 226b through 226n. Data volumes 226 may be attached, mounted, mapped, or otherwise connected to particular clients (e.g., a virtual compute instance of virtual compute service 240), providing virtual block-based storage (e.g., hard disk storage or other persistent storage) as a contiguous set of logical blocks. In some embodiments, a data volume 226 may be divided up into multiple data chunks or partitions (including one or more data blocks) for performing other block storage operations, such as snapshot operations or replication operations. A volume snapshot of a data volume 226 may be a fixed point-in-time representation of the state of the data volume 226. In some embodiments, volume snapshots may be stored remotely from a storage host 224 maintaining a data volume, such as in another storage service 260. Snapshot operations may be performed to send, copy, and/or otherwise preserve the snapshot of a given data volume in another storage location, such as a remote snapshot data store in other storage service 260.

Block-based storage service 220 may implement block-based storage service control plane 230 to assist in the operation of block-based storage service 220. In various embodiments, block-based storage service control plane 230 assists in managing the availability of block data storage to clients, such as programs executing on compute instances provided by virtual compute service 240 and/or other network-based services 260 located within provider network 200 and/or optionally computing systems (not shown) located within one or more other data centers, or other computing systems external to provider network 200 available over a network 270. Access to data volumes 226 may be provided over an internal network within provider network 200 or externally via network 270, in response to block data transaction instructions.

Figure 3:
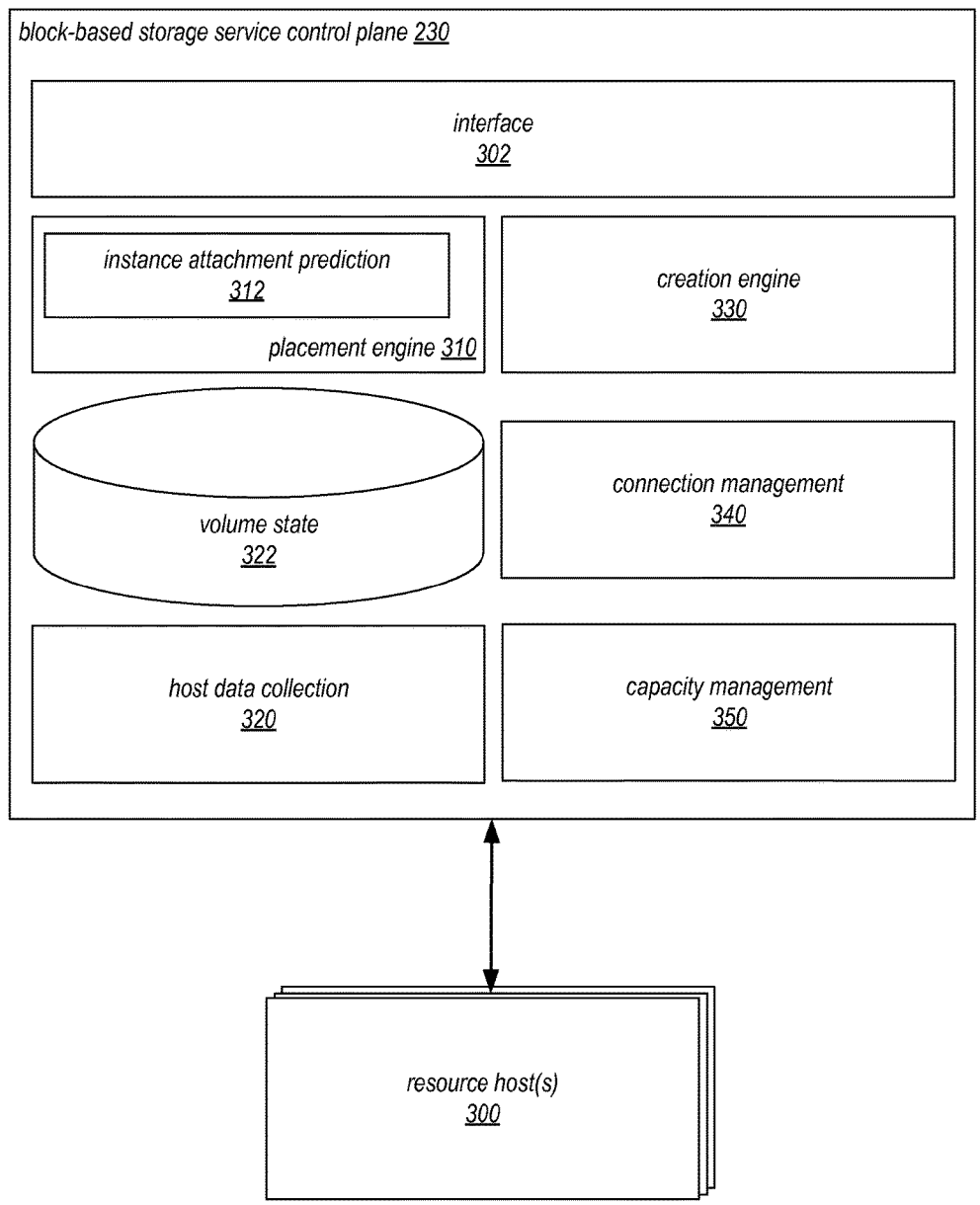
FIG. 3 is a logical block diagram illustrating block-based storage service control plane, according to some embodiments.

Block-based storage service control plane 230 may provide a variety of services related to providing block level storage functionality, including the management of user accounts (e.g., creation, deletion, billing, collection of payment, etc.). Control plane 230 may implement capacity management, which may generate and manage a capacity model for storage service 220, and may direct the performance of responsive actions based on the capacity of storage service 220. Block-based storage service control plane 230 may further provide services related to the creation, usage and deletion of data volumes 226 in response to configuration requests. Block-based storage service control plane 230 may also provide services related to the creation, usage and deletion of volume snapshots on other storage service 250. Block-based storage service control plane 230 may also provide services related to the collection and processing of performance and auditing data related to the use of data volumes 226 and snapshots of those volumes. FIG. 3, discussed below, provides various examples of block-based storage service control plane 230 that implements dynamic creation of resources for connection to client resources, in some embodiments.

Clients 210 may encompass any type of client configurable to submit requests to network provider 200. For example, a given client 210 may include a suitable version of a web browser, or may include a plug-in module or other type of code module configured to execute as an extension to or within an execution environment provided by a web browser. Alternatively, a client 210 may encompass an application such as a database application (or user interface thereof), a media application, an office application or any other application that may make use of compute instances, a data volume 226, or other network-based service in provider network 200 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 210 may be configured to generate network-based services requests according to a Representational State Transfer (REST)-style network-based services architecture, a document- or message-based network-based services architecture, or another suitable network-based services architecture. In some embodiments, a client 210 (e.g., a computational client) may be configured to provide access to a compute instance or data volume 226 in a manner that is transparent to applications implement on the client 210 utilizing computational resources provided by the compute instance or block storage provided by the data volume 226.

Clients 210 may convey network-based services requests to provider network 200 via external network 270. In various embodiments, external network 270 may encompass any suitable combination of networking hardware and protocols necessary to establish network-based communications between clients 210 and provider network 200. For example, a network 270 may generally encompass the various telecommunications networks and service providers that collectively implement the Internet. A network 270 may also include private networks such as local area networks (LANs) or wide area networks (WANs) as well as public or private wireless networks. For example, both a given client 210 and provider network 200 may be respectively provisioned within enterprises having their own internal networks. In such an embodiment, a network 270 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and provider network 200. It is noted that in some embodiments, clients 210 may communicate with provider network 200 using a private network rather than the public Internet.

FIG. 3 is a logical block diagram illustrating block-based storage service control plane, according to some embodiments. As noted above, multiple resource hosts, such as resource hosts 300, may be implemented in order to provide block-based storage services. A resource host may be one or more computing systems or devices, such as a storage server or other computing system (e.g., computing system 1000 described below with regard to FIG. 7). Each resource host may maintain respective replicas of data volumes. Some data volumes may differ in size from other data volumes, in some embodiments. Resource hosts 300 may also provide multi-tenant storage. For example, in some embodiments, one resource host may maintain a data volume for one account of block-based storage service 220, while another data volume maintained at the same resource host may be maintained for a different account. Resource hosts 300 may persist their respective data volumes in one or more block-based storage devices (e.g., hard disk drives, solid state drives, etc.) that may be directly attached to a computing system or device implementing the respective resource host. Resource hosts 300 may implement different persistent storage devices. For example, some resource hosts may implement solid state drives (SSDs) for persistent block storage, while other resource hosts may implement hard disk drives (HDDs) or other magnetic-based persistent storage devices. In this way different volume types, specifications, and other performance characteristics may be provided according to the persistent storage devices implemented at the resource host.

Block-based storage service 220 may manage and maintain data volumes in a variety of different ways. Different durability schemes may be implemented for some data volumes among two or more resource hosts as a distributed resource maintaining a same replica of a data volume at different partitions of the data volume. For example, different types of mirroring and/or replication techniques may be implemented (e.g., RAID 1) to increase the durability of a data volume, such as by eliminating a single point of failure for a data volume. In order to provide access to a data volume, resource hosts may then coordinate I/O requests, such as write requests, among the two or more resource hosts maintaining a replica of a data volume. For example, for a given data volume, one resource host may serve as a master resource host. A master resource host may, in various embodiments, receive and process requests (e.g., I/O requests) from clients of the data volume. Thus, the master resource host may then coordinate replication of I/O requests, such as write requests, or any other changes or modifications to the data volume to one or more other resource hosts serving as slave resource hosts. Thus, when a write request is received for the data volume at a master resource host, the master resource host may forward the write request to the slave resource host(s) and wait until the slave resource host(s) acknowledges the write request as complete before completing the write request at the master resource host.

Please note, that in some embodiments, the role of master and slave resource hosts may be assigned per data volume. For example, for a data volume maintained at one resource host, the resource host may serve as a master resource host. While for another data volume maintained at the same resource host, the resource host may serve as a slave resource host. Resource hosts may implement respective I/O managers. The I/O managers may handle I/O requests directed toward data volumes maintained at a particular resource host. Thus, I/O managers may process and handle a write request to volume at resource host, for example. I/O managers may be configured to process I/O requests according to block-based storage service application programming interface (API) and/or other communication protocols, such as such as internet small computer system interface (iSCSI). Master resource hosts may direct other operations for data volumes, like snapshot operations or other I/O operations (e.g., serving a read request). In some embodiments, I/O managers of resource host(s) 300 may allocate processing capacity to provide access to data volumes stored at resource host(s) 300, such as by allocating IOPS, throughput, or other resources, to provide specified performance for data volumes.

Resource hosts may be located within different infrastructure localities. Infrastructure localities may be defined by devices, such as server racks, networking switches, routers, or other components, power sources (or other resource host suppliers), or physical or geographical locations (e.g., locations in a particular row, room, building, data center, fault tolerant zone, etc.). Infrastructure localities may vary in scope such that a resource host (and replicas of data volumes implemented on the resource host) may be within multiple different types of infrastructure localities, such as a particular network router or brick, a particular room location, a particular site, etc.

In at least some embodiments, control plane 230 may implement host data collection 320 to collect information, metrics, metadata, or any other information for performing volume creating or managing data volumes. Host data collection 320 may periodically sweep resource host(s) 300 with a query for the information, metrics, or metadata. For example, resource hosts may provide current utilization metrics, ongoing tasks or operations (e.g., such as migration or remirror tasks), and any other state information for the resource host, including volume specific information for volumes residing at the resource hosts. In some embodiments, host data collection 320 may aggregate the data according to infrastructure localities, partitions, resource hosts, or other granularities for block-based storage service 220. Host data collection 320 may store the data at volume state store 322, which may persistently maintain the collected data. In some embodiments volume state store 322 may be implemented as a database or otherwise searchable/query-able storage system to provide access to other components of control plane 230.

Control plane 230 may implement placement engine 310, in various embodiments, which may perform one or multiple different placement techniques to place data volumes. Placement engine 310 may perform various kinds of analysis to identify placement locations for new resources that are being created, such as instances (e.g., replicas) of new data volumes, or migrating currently placed data volumes according to placement requests for new placement locations data volumes. Analysis may be performed with respect to the placement criteria, discussed above, to determine placement locations which may be optimal for individual resources, or for the block-based storage service as a whole.

For example, placement engine 310 may implement resource host filtering. As discussed above with regard to FIG. 1, resource host filtering may remove from evaluated resource hosts for a placement request, those resource hosts which do not satisfy placement constraints for a resource. For example, placement constraints may include resource hosts located outside of specified logical or physical localities (e.g., specified server pools, specified locations with respect other resources, such as implementing server rack diversity between master and slave replicas of a data volume), resource hosts with insufficient capacity to host the resource (e.g., insufficient processing, storage, and/or network capability to host the resource), and/or blacklisted or otherwise explicitly excluded resource hosts (e.g., a list of unavailable network addresses).

Placement engine 310 may select resource hosts as placement locations based on different placement techniques, determining some resource hosts as candidate resource hosts to provide for placement recommendations. In some embodiments, scores may be generated as part of placement techniques for placements at the selected resources that reflect one or more multiple different considerations for determining an optimal placement. For example, analysis may be performed to prevent multiple master-slave replica pairs from being placed on the same two resource hosts. In some embodiments, resource host fragmentation analysis may be performed, to optimize placement of resources on resource hosts that can host the resource and leave the least amount of space underutilized. Evaluation of placement criteria may also include: evaluating available capacity to host the resource at the resource host; time since last communication was received; a ratio or other combination of utilization data to determine the ways in which multiple portions of a resource host (e.g., storage, processing, or network) are optimally utilized to host a resource, resource capacity fragmentation (e.g., how much capacity at resource host(s) is wasted as a result of placing the resource at the resource host); and desired locality (e.g., in respective infrastructure localities or units as discussed above).

In at least some embodiments, a placement criteria may evaluate the infrastructure localities of prospective placement locations of a resource (or instances of a resource, such as the placement of master, slave(s) of a data volume) with respect to the infrastructure locality of a client resource that accesses the resource (such as a virtual compute instance mapped to the data volume). For example, a server rack, networking device, data center room, server pool or other infrastructure locality that implements or is associated with a virtual compute instance that accesses a data volume (e.g., by mounting, connecting, or attaching the data volume) may be considered in the analysis (e.g., evaluating the server rack, networking device, data center room, or server pool of possible placement locations to determine whether or not a possible placement location is located at, implemented by, or associated with the same server rack, networking device, data center room, or server pool of the virtual compute instance). Placement criteria may promote the desirability of co-locating a data volume with a virtual compute instance that attaches the data volume in the same infrastructure locality. In some embodiments, placement criteria may provide a priority, ranking, grouping, or other sequence for placement of a resource with respect to common infrastructure locality. For instance, a common networking device may be of highest desirability, followed by a common data center room, followed by a common network spine, and so on. Thus, the infrastructure locality or localities of possible placement locations may be evaluated according to the priority provided in the placement criteria.

To determine the infrastructure localities of possible placement locations, volume state 322 may be accessed to lookup the various associations stored for each of the resource host(s) available to host a data volume. However, the infrastructure locality of the virtual compute instance or other client resource of a data volume may be unknown until the time of dynamic creation (e.g., a connection request) or when a creation request specifies the particular virtual compute instance to which the resource will be attached. Dynamic creation of the data volume may allow for placement engine 310 to perform the above discussed techniques with respect to infrastructure locality. Other placement criteria may also be considered (such as the various examples discussed above) and other placement techniques may also be performed.

In at least some embodiments, placement engine 310 may implement instance attachment prediction 312. Instance attachment prediction 312 may implement various techniques to predict a virtual compute instance (or other client resource) to which a resource is likely to be connected. Such a prediction may be used to determine a predicted infrastructure locality upon which to perform the above described placement techniques. For instance, as discussed in FIG. 6 below, one or more instances (e.g., replicas) of a resource may be created in response to receiving a creation request (instead of dynamically creating the instances when the actual infrastructure locality of the actual instance is known). Instead, the placement criteria that considers infrastructure locality of a connected resource may be performed utilizing infrastructure locality. Instance attachment predication 312 may perform various kinds of statistical analysis to predict the infrastructure locality. For instance, the patterns of recent connection or attachment requests may be evaluated to determine a common or likely instance or logical group of instances, to which data volumes are typically attached. The infrastructure locality of the likely instance (or group of instances) may then be identified as the predicted infrastructure locality. In some embodiments, machine learning techniques may be implemented to improve the prediction criteria used to determine the likely instance (or group of instances). Consider the scenario where both predictions of infrastructure locality (and the correspondingly determined likely instance(s) used to identify the predicted infrastructure locality) and actual infrastructure localities of instances that attach resources are stored (e.g., predictions for creation requests corresponding to a particular user account or to the block-based storage service as a whole). Common features may be identified between those instances (and their infrastructure localities) and the data volumes that are connected, which may be used to update the accuracy of the predication criteria used to identify the likely virtual compute instances.

Control plane 230 may implement interface 302. Interface 302 may be a programmatic (e.g., API) and/or graphical user interface (GUI) via which requests to create, attach, connect, or otherwise manage data volumes hosted in block-based storage service 220 may be received. Creation engine 230 may perform various workflows, tasks, and/or other operations to create resources. For some resource creation requests, such as those resource creation requests where a virtual compute instance that attaches the data volume is unknown, creation engine 330 may store a creation intention (e.g., in volume state 322) to be accessed at a time when the resource is dynamically created. Creation engine 330 may provide a notification of a stored creation intention to capacity management 350 so that a capacity model for the block-based storage service may be updated to include the resource to be created. Creation engine 330 may request placement location(s) from placement engine 310, including the instance and/or infrastructure locality for the instance, in some embodiments.

Control plane 230 may implement connection management 340 to direct the establishment of a connection between data volumes and other client resources, such as an instance. For example, a connection request may be received for a virtual compute instance. Connection management 340 may notify creation engine 330 to create the data volume to be connected to the virtual compute instance. Connection management 340 may generate the necessary credentials (e.g., tokens, lease identifiers, or keys) to provide to the virtual compute instance, as well as notify the resource host(s) that will host the created data volume of the virtual compute instances access rights. In at least some embodiments, resource host(s) may restrict access to a created data volume to those client resources that are identified according to the provided credentials.

Control plane 230 may implement capacity management 350 to maintain a capacity model for placing data volumes in block-based storage service and managing capacity changes or recommendations. Capacity management 350 may include creation intentions in its understanding of total utilized capacity for resource hosts(s) 300 as a whole, in some embodiments, although the specific resource host that will host the data volume is not yet known. Upon dynamic creation of the data volume, capacity management 350 may update the model to reflect the actual location of the data volume. In at least some embodiments, capacity management may monitor the rates at which creation requests are received which result in stored creation intentions, rather than created data volumes. Additionally, the rates at which these created data volumes are subsequently connected (or not connected and thus not created) may be monitored. In this way, future capacity needs to host the intended, but not yet created, data volumes may be forecasted. Thin provisioning schemes, for instance, may be implemented which over provision storage hosts in block-based storage service 220, as the monitored rates may indicate that only a subset (e.g., 70%) of intended data volume creations are actually performed.

Figure 4:
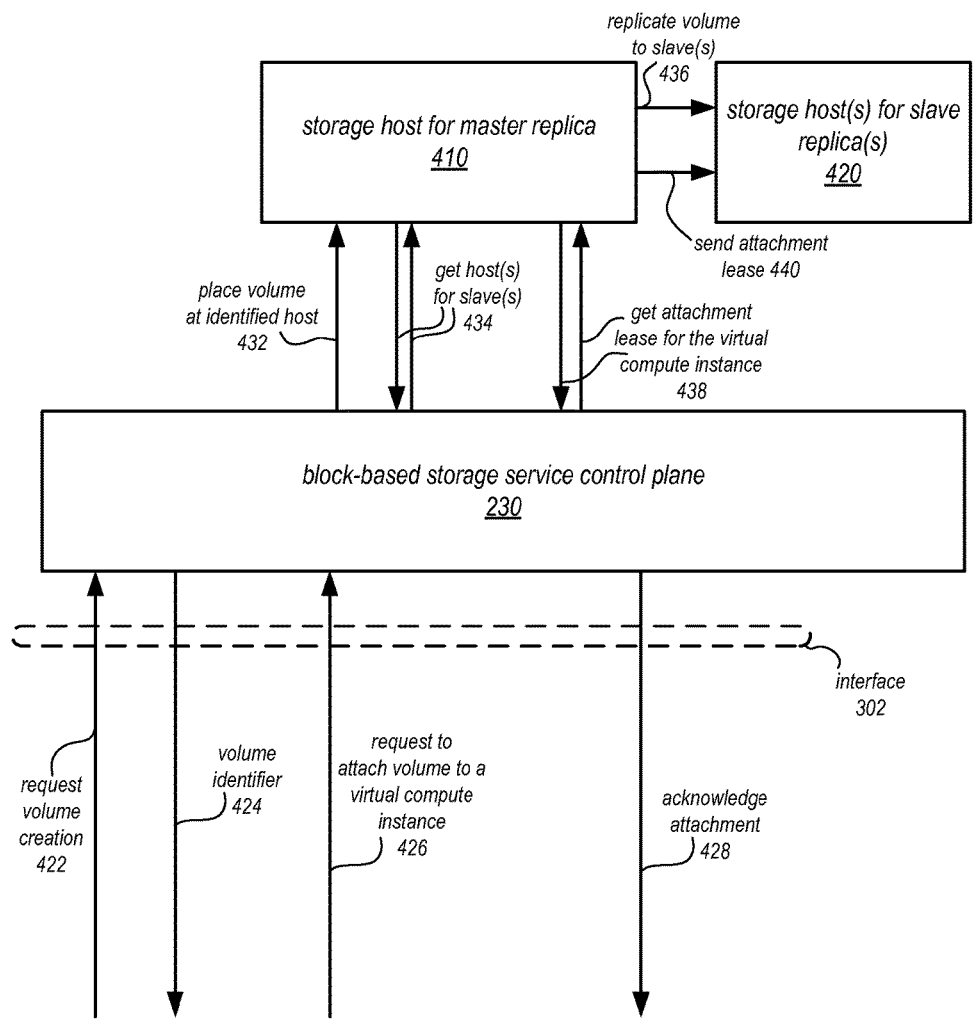
FIG. 4 is a logical block diagram illustrating interactions between a block-based storage service control plane and storage hosts to implement dynamic resource creation to connect client resources, according to some embodiments.

FIG. 4 is a logical block diagram illustrating interactions between a block-based storage service control plane and storage hosts to implement dynamic resource creation to connect client resources, according to some embodiments. Requests to create a data volume 422 may be received at block-based storage service control plane 230 via interface 302. The creation request may specify various features or characteristics of the data volume, such as the type of data volume (e.g., magnetic-based storage hardware or solid state drive-based storage hardware), the size or amount of storage (e.g., 10 GB), the performance of the data volume (e.g., 1000 IOPS), or any other configurable characteristic of the data volume. Block-based storage service control plane 230 may store an intention to create the volume, and provide a volume identifier 424.

A request to attach the created volume to a virtual compute instance 426 may be received via interface 302 at block-based storage service control plane. The request may include the provided volume identifier and an identifier for the virtual compute instance. Block-based storage service control plane 230 may dynamically create the storage volume, selecting a storage host to serve as the master replica for the data volume with respect to an infrastructure locality of the virtual compute instance. For instance, a storage host may be determined as the placement location that is connected to the same networking device as a virtualization host (e.g., 242*a* in FIG. 2) that hosts the identified virtual compute instance. Block-based storage service control plane 230 may place 432 the volume at the identified host 410. In at least some embodiments, the master replica 420 may be configured to get host(s) for slave replica(s) 434 from block-based storage service control plane 230, which may perform the same placement technique to identify storage host(s) for slave replica(s) 420 according to the infrastructure locality of the identified virtual compute instance (e.g., identifying hosts as placement locations 420 that are connected to the same networking device). Once identified, master replica 410 may replicate 436 the volume to the slave replica(s) 420. Master replica 410 may then get the attachment leas for the virtual compute instance 438 in order to provide access rights to the data volume at master replica 410. Master replica 410 may then send the lease 440 to slave replica(s) 420 for the virtual compute instance. Block-based storage service control plane 230 may then acknowledge the attachment 428.

Please note that the examples described above with regard to FIG. 4, are not intended to be limiting as to the various other interactions that may be performed to provide dynamic resource creation to connect resources. For instance, in some embodiments, master replica 410 may be created in response to volume creation request 422, while slave replica(s) 420 may be dynamically created when the request to attach the volume 426 is received.

Figure 5:
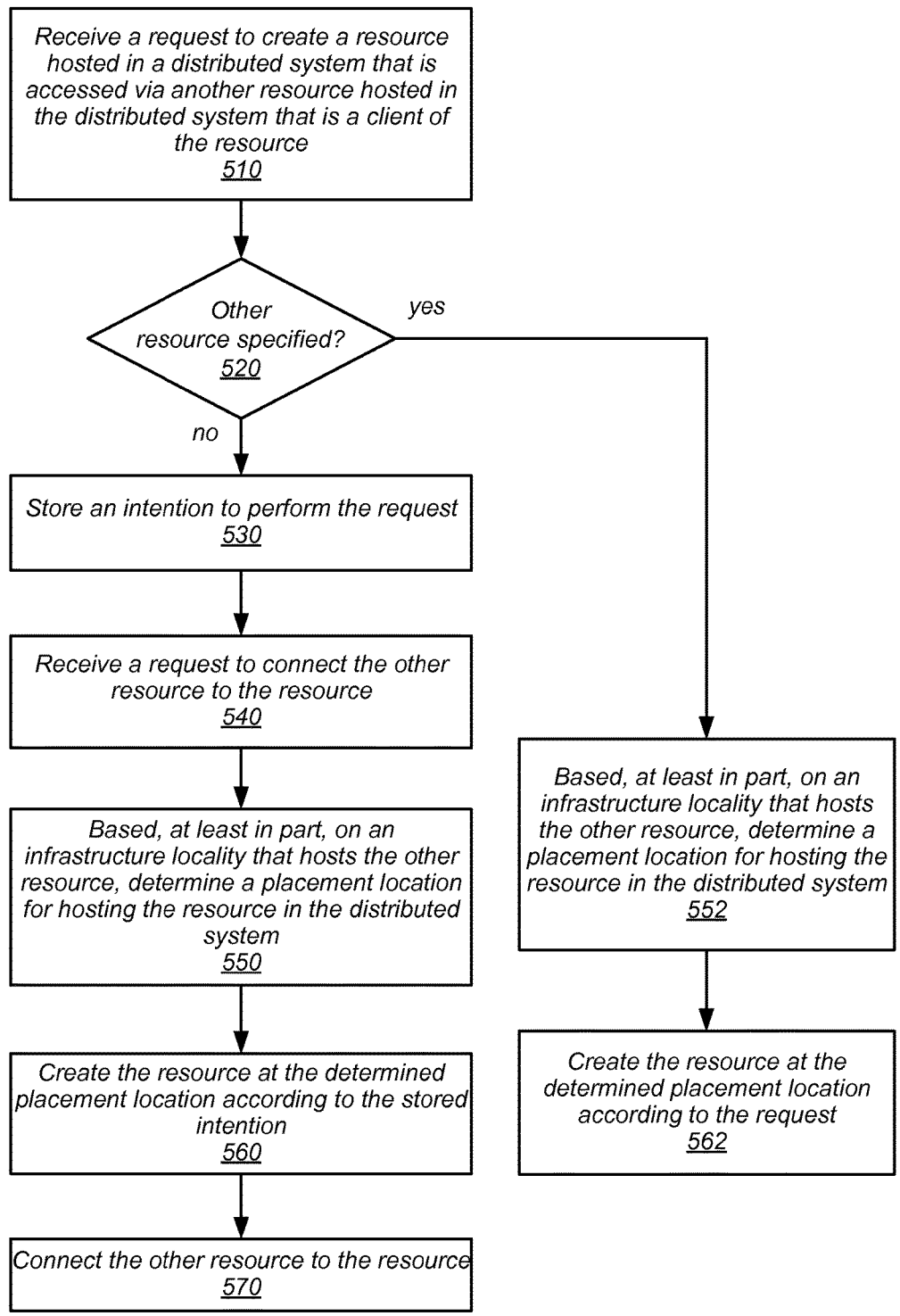
FIG. 5 is a high-level flow chart illustrating various methods and techniques for dynamic resource creation to connect client resources, according to some embodiments.

The examples of dynamic resource creation for connecting resources, according to some embodiments, discussed above with regard to FIGS. 2-4, have been given in regard to a block-based storage service, virtual compute service, and/or other network-based services. Various other types or configurations of systems creating resources at resource hosts that are connected to other resources for access may implement these techniques. Different configurations of the various modules, components, systems, and or services described above that may implement dynamic resource creation for connecting resources. FIG. 5 is a high-level flow chart illustrating various methods and techniques for dynamic resource creation to connect client resources, according to some embodiments. These techniques may be implemented using a control plane or other component for creating resources in a distributed system, as described above with regard to FIGS. 2-4.

Resources may be one of many different types of resources, such as one of various types of physical or virtualized computing resources, storage resources, or networking resources, such as data volumes and virtual compute instances discussed above. As indicated at 510, a request may be received to create a resource hosted in a distributed system that is accessed via another resource hosted in the distributed system that is a client of the resource, in various embodiments. The resource may be remote from the client resource, and may be accessed over a network connection between the resource and client resource in the distributed system. For example, if the client resource is a computing resource accessing a remote data volume, a network-based storage protocol, such as iSCSI, may be implemented to allow the computing resource to access the remote data volume. The resource creation request may include various characteristics, criteria, settings, features or other specified aspects of the resource to be created. If, for instance, the resource is a storage volume, then the request may include a type of storage volume (e.g., magnetic-based or solid-state storage-based), size of storage volume, or performance characteristics of the storage volume (e.g., number of Input/Output Operations per Second (IOPS)).

In some embodiments, the creation request may specify the other resource (i.e., the client resource). For instance, the request may be formatted according to a programmatic interface that allows the option of specifying a particular resource that will be connected to the resource to be created. As indicated by the positive exit from 520, in such cases, the resource may be created in response to the creation request. Based, at least in part on an infrastructure locality that hosts the specified other resource, a determination of a placement location may be made for hosting the resource in the distributed system, as indicated at 552, which is similar to the determination discussed below with regard to element 550. The resource may be created at the determined placement location according to the request (e.g., created according to the specified features of the resource in the request), as indicated at 562.

If, however, the creation request does not specify the other instance (e.g., the client resource), then, as indicated at 530, an intention to perform the request is stored. The stored intention may include the various characteristics, criteria, settings, features or other specified aspects of the resource to be created. A resource identifier may be provided or sent back to the requestor, in some embodiments.

Subsequently, a request may be received to connect the other resource to the resource, as indicated 540. The connection request may identify the resource (e.g., by the resource identifier) along with the client resource (e.g., by another resource identifier). An infrastructure locality for the other resource (or multiple infrastructure localities as a resource may be associated with multiple infrastructure localities) may be identified. For instance, metadata, or other information describing the other resource may be requested, evaluated, or located in a metadata store for the distributed system. As noted above, an infrastructure locality may be defined by devices, such as server racks, networking switches, routers, or other components, power sources (or other resource host suppliers), or physical or geographical locations (e.g., locations in a particular row, room, building, data center, fault tolerant zone, etc.), or logical groups of resources and/or device As indicated at 550, based, at least in part, on the infrastructure locality that hosts the other resource, a placement location for hosting the resource in the distributed system may be performed. Determining a placement location may be performed according to a variety of techniques. In at least some embodiments, a comparison of infrastructure localities for possible placement locations may be compared with the infrastructure locality of the other resource to determine a placement location that is co-located at the infrastructure locality of the other resource. In some embodiments, multiple placement criteria may be considered (including the infrastructure locality) to determine placement decisions for resources. For instance, a placement technique may optimize placement decisions to place resources in a way that maximizes a certain values, such as utilization metric (e.g., available storage), amongst multiple resource hosts in a distributed system for example. In some embodiments, placement techniques may implement different combinations of placement criteria, weighted the same or differently to place resources in way that maximizes multiple values (e.g., a score generated from weighting utilization metrics, fragmentation metrics, metrics that indicate optimal configuration or locality, or any other placement criteria). Placement scores may be generated for possible placement locations, and placement location determinations may be made according to the different scores (e.g., picking the highest score, or randomly picking one of a group of scores above a certain threshold). In addition to evaluating the infrastructure locality, the features, characteristics, and/or other information included in the stored intention may also be used, in some embodiments, to make placement decisions (e.g., locating a storage host with enough capacity to store a data volume of the size indicated in the stored intention).

In this way, placement criteria may be used to determine a best or optimal placement location for an individual resource, as well as for placement of resources across the distributed system as a whole. For example, in order to provide or improve availability, durability, and/or other performance characteristics of resources, placement criteria may be used to determine particular locations at which resources should be placed (e.g., the same infrastructure locality as the infrastructure locality of the other resource, such as a same network router or brick). If no such location is available, then the placement criteria may indicate a less optimal location to place the resource (e.g., a resource host that is in a less efficient infrastructure locality, such as a different network router or brick than another resource with which the placed resource communicates). Placement criteria may include, but are not limited to, a location of the resource with respect to other resources (e.g., placing a master replica with respect to one or more slave replicas and a virtual compute instance), available bytes, IOPs, or slots, a resource utilization balance, such as bytes to IOPs balance, impact on capacity fragmentation, hardware/software characteristics, and/or various desired location-based configurations.

Once the placement location is determined, then the resource may be created at the determined placement location according to the stored intention, as indicated at 560. For example, the resource may be created according to the features, characteristics and other information in the stored intention. The other resource may then be connected to the resource, as indicated at 570. For instance, various access controls, policies, keys, tokens, leases, states, or other information may be exchanged to provide the other resource with access to the resource.

Figure 6:
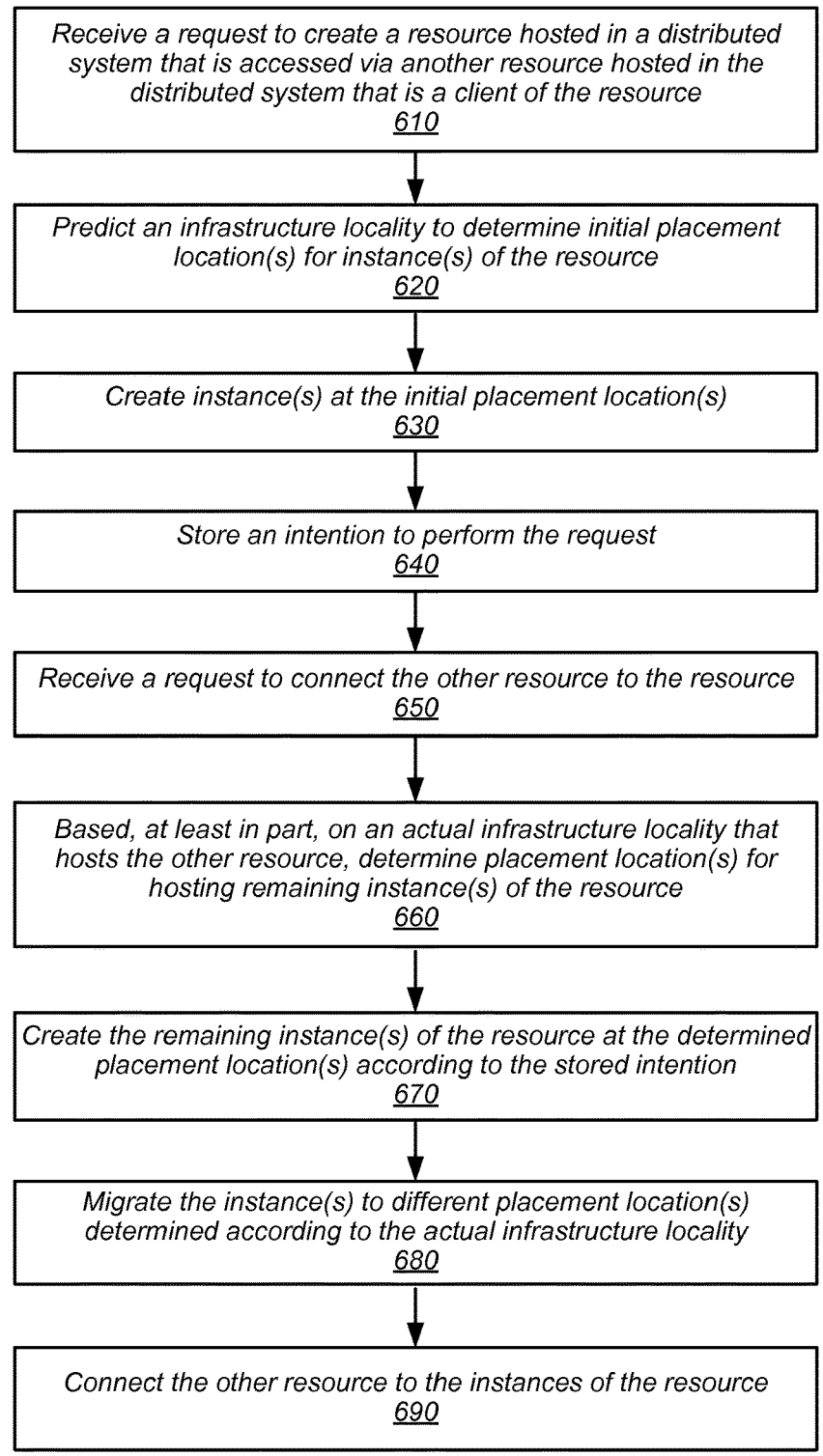
FIG. 6 is a high-level flow chart illustrating various methods and techniques for predicting infrastructure localities as part of dynamic resource creation to connect client resources, according to various embodiments.

Some resources that are created may include multiple instances of the resource. An instance may be a replica, partition, or portion of a resource hosted in the distributed system. In at least some embodiments, instances may be separately hosted at different locations in the distributed system (e.g., replicas of a data volume on different storage hosts). While techniques, such as those described above may be performed to dynamically create all of the instances of a resource, in some embodiments, some instances of a resource may be dynamically created and others of the instances of a resource may be created upon the initial creation request. FIG. 6 is a high-level flow chart illustrating various methods and techniques for predicting infrastructure localities as part of dynamic resource creation to connect client resources, according to various embodiments.

As indicated at 610, a request may be received to create a resource hosted in a distributed system that is accessed via another resource hosted in the distributed system that is a client of the resource. The resource may include multiple instances (e.g., a master replica and slave replica(s) of a data volume). One or some of the instances may be created in response to the creation request. To determine a placement location, without knowledge of an infrastructure locality for the other resource, an infrastructure locality may be predicated to determine initial placement location(s) for instance(s) of the resource, as indicated at 620. For example, various kinds of statistical analysis may be performed on previous predictions of infrastructure localities of the other resource connected to the resource, to compare the previous predictions to the actual infrastructure localities of the other resource that ultimately connected to the resource. For instance, the patterns of recent connection or attachment requests may be evaluated to determine the infrastructure locality of a common resource or logical group of resources, to which resources are likely connected. In some embodiments, machine learning techniques may be implemented to improve prediction criteria used to evaluate the historical connection data and identify likely resources and infrastructure localities. In some embodiments, other features or characteristics may be evaluated. For example, the creation request may be associated with a user account that implements physical or logical group of resources associated with an infrastructure locality. This infrastructure locality may be identified as the predicted infrastructure locality as the request is associated with the same user account that implements this logical or physical group. The initial placement locations may then be determined according to the placement techniques discussed above in FIG. 5 utilizing the predicted infrastructure locality. As indicated at 630, instances may be created at the initial placement locations according to the request (e.g., creating instances according to the features specified in the creation request). The intention to perform the request may also be stored, as indicated at 640.

As indicated at 650, a request may be subsequently received to connect the other resource to the resource. The connection request may identify the resource (e.g., by the resource identifier) along with the client resource (e.g., by another resource identifier). As indicated at 660, based, at least in part, on an actual infrastructure locality, placement location(s) for hosting remaining instance(s) of the resource may be determined, in various embodiments (which may be determined as discussed above with regard to FIG. 5). For instance, the other resource specified in the connection request may include infrastructure locality information, or an identifier that may be used to look up the infrastructure locality of the other resource. The remaining instance(s) of the resource may then be created at the determined placement location(s) according to the stored intention, as indicated at 670. In at least some embodiments, in order to locate all of the instances of the resource in optimal locations with respect to the other resource, the instance(s) created in response to the creation request may be migrated from the initial placement location(s) to different placement locations determined according to the actual infrastructure locality (as opposed to the predicted locality). Then, the other resource may be connected to the instances of the resource, as indicated at 690.

The methods described herein may in various embodiments be implemented by any combination of hardware and software. For example, in one embodiment, the methods may be implemented by a computer system (e.g., a computer system as in FIG. 7) that includes one or more processors executing program instructions stored on a computer-readable storage medium coupled to the processors. The program instructions may be configured to implement the functionality described herein (e.g., the functionality of various servers, resource hosts, control planes, managers and/or other components, such as those that implement the block-based storage service described herein). The various methods as illustrated in the figures and described herein represent example embodiments of methods. The order of any method may be changed, and various elements may be added, reordered, combined, omitted, modified, etc.

Embodiments of dynamic resource creation for connecting resources as described herein may be executed on one or more computer systems, which may interact with various other devices. FIG. 7 is a block diagram illustrating an example computer system, according to various embodiments. For example, computer system 1000 may be configured to implement storage and/or compute nodes of a compute cluster, a data stores, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, block-based storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a resource host, in different embodiments. In some embodiments, program instructions 1025 may implement multiple separate clients, nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example.

Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090, for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 7 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A distributed system, comprising:
  a plurality of compute nodes, configured to host resources in the distributed system;
  a network-based interface for the distributed system;
  one or more compute nodes that implement a control plane for the distributed system, the control plane configured to:
    receive, via the network-based interface, a request to create a resource hosted in the distributed system, wherein the resource is accessed via another resource hosted in the distributed system that is a client of the resource;
    store an intention to perform the request to create the resource;
    subsequent to the receipt of the request to create the resource:
      receive, via the network-based interface, a request to connect the other resource to the resource, wherein the other resource is hosted at an infrastructure locality within the distributed system;
      access the stored intention to:
        identify a placement location for hosting the resource in the distributed system according to the infrastructure locality;
        create the resource according to the stored intention at the identified placement location; and
        connect the other resource to the created resource.

2. The system of claim 1,
  wherein the resource comprises a plurality of instances of the resource hosted in the distributed system;
  wherein the control plane is further configured to:
    prior to the request to connect the other resource to the resource, create one or more of the instances of the resource at respective initial placement locations in the distributed system according to the resource creation request;
  wherein the resource created at the identified placement location is a remaining one of the instances of the resource; and
  wherein the control plane is further configured to migrate the one or more instances from the initial placement locations to different placement locations identified according to the infrastructure locality.

3. The system of claim 1, wherein the control plane is configured to:

receive, via the network-based interface, another request to create a different resource in the distributed system, wherein the other request specifies a particular resource as a client of the different resource for accessing the different resource;

in response to the receipt of the other request:
identify a placement location for the different resource according to an infrastructure locality for the particular resource; and
create the different resource at the placement location.

4. The system of claim 1, wherein the distributed system is a provider network, wherein the resource is a data volume of a virtual block-based storage, wherein the other resource is a virtual compute instance of a virtual compute service, and wherein the connection between the resource and the other resource mounts the data volume to the virtual compute instance.

5. A method, comprising:
performing, by one or more computing devices:
receiving a request to create a resource hosted in a distributed system, wherein the resource is accessed via another resource hosted in the distributed system that is a client of the resource;
storing an intention to perform the request to create the resource;
subsequent to receiving the request to create the resource:
receiving a request to connect the other resource to the resource, wherein the other resource is hosted at an infrastructure locality within the distributed system;
based, at least in part, on the infrastructure locality, determining a placement location for hosting the resource in the distributed system;
creating the resource at the determined placement location according to the stored intention; and
connecting the other resource to the resource.

6. The method of claim 5,
wherein the resource comprises a plurality of instances of the resource hosted in the distributed system;
wherein the method further comprises:
prior to receiving the request to connect the other resource to the resource:
determining an initial placement location for at least one of the instances of the resource;
creating the at least one instance at the respective initial placement location according to the resource creation request;
wherein the resource created at the identified placement location is a remaining one of the instances of the resource; and
wherein the method further comprises migrating the at least one instance from the initial placement location to a different placement location identified according to the infrastructure locality.

7. The method of claim 6, wherein determining the initial placement location comprises:
predicting an infrastructure locality for the other resource; and
identifying the initial placement location according to the predicted infrastructure locality.

8. The method of claim 7, wherein predicting the infrastructure locality for the other resource is based, at least in part, on a plurality of previously performed connection requests for a user account associated with the resource.

9. The method of claim 5, wherein storing the intention comprises updating capacity information for the distributed system to include the resource.

10. The method of claim 5, further comprising:
wherein the request to create the resource is received from a client of the distributed system;
in response to storing the intention, providing a resource identifier for the resource to the client; and
wherein the request to connect the other resource to the resource includes the resource identifier.

11. The method of claim 5, wherein the infrastructure locality is a networking device in the distributed system that is connected to a resource host for the other resource, and wherein the determined placement location is another resource host connected to the same networking device.

12. The method of claim 5, wherein the other resource is created at the distributed system subsequent to receiving the request to create the resource.

13. The method of claim 5, wherein the resource is a storage volume, wherein the other resource is a virtual compute instance, and wherein the connection mounts the storage volume to the virtual compute instance.

14. A non-transitory, computer-readable storage medium, storing program instructions that when executed by one or more computing devices cause the one or more computing devices to implement:
receiving a request to create a resource hosted in a distributed system, wherein the resource is accessed via another resource hosted in the distributed system that is a client of the resource;
storing an intention to perform the request to create the resource;
receiving a request to connect the other resource to the resource, wherein the other resource is hosted at an infrastructure locality within the distributed system;
based, at least in part, on the infrastructure locality, determining a placement location for hosting the resource in the distributed system;
creating the resource at the determined placement location according to the stored intention; and
connecting the other resource to the resource.

15. The non-transitory, computer-readable storage medium of claim 14,
wherein the resource comprises a plurality of instances of the resource hosted in the distributed system;
wherein the program instructions cause the one or more computing devices to further implement:
prior to receiving the request to connect the other resource to the resource:
determining an initial placement location for at least one of the instances of the resource;
creating the at least one instance at the respective initial placement location according to the resource creation request;
wherein the resource created at the identified placement location is a remaining one of the instances of the resource; and
wherein the program instructions cause the one or more computing devices to further implement migrating the at least one instance from the initial placement location to a different placement location identified according to the infrastructure locality.

16. The non-transitory, computer-readable storage medium of claim 15, wherein, in determining the initial placement location, the program instructions cause the one or more computing devices to implement:

predicting an infrastructure locality for the other resource; and identifying the initial placement location according to the predicted infrastructure locality.

17. The non-transitory, computer-readable storage medium of claim 16, wherein predicting the infrastructure locality for the other resource is based, at least in part, on identifying a logical grouping of previously created resources requests for a user account associated with the resource.

18. The non-transitory, computer-readable storage medium of claim 14, wherein the program instructions cause the one or more computing devices to further implement:

receiving another request to create a different resource in the distributed system, wherein the other request specifies a particular resource as a client of the different resource for accessing the different resource;

identifying a placement location for the different resource according to an infrastructure locality for the particular resource; and creating the different resource at the placement location.

19. The non-transitory, computer-readable storage medium of claim 14, wherein, in determining the placement location for the resource, the program instructions cause the one or more computing devices to implement:

generating placement scores for a plurality of possible locations in the distributed system with respect to the infrastructure locality;

based, at least in part, on the placement scores, identifying the placement location out of the possible locations.

20. The non-transitory, computer-readable storage medium of claim 14, wherein the distributed system is a provider network, wherein the resource is a data volume of a virtual block-based storage, wherein the other resource is a virtual compute instance of a virtual compute service, and wherein the connection between the resource and the other resource mounts the data volume to the virtual compute instance.

* * * * *